United States Patent
Miyata et al.

(10) Patent No.: US 8,638,017 B2
(45) Date of Patent: Jan. 28, 2014

(54) ROTOR FOR PERMANENT MAGNET ROTATING MACHINE

(75) Inventors: Koji Miyata, Tokyo (JP); Minori Miyata, legal representative, Fukui (JP); Atsushi Miyata, legal representative, Fukui (JP); Takehisa Minowa, Tokyo (JP); Hajime Nakamura, Tokyo (JP); Koichi Hirota, Tokyo (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 339 days.

(21) Appl. No.: 12/562,303

(22) Filed: Sep. 18, 2009

(65) Prior Publication Data

US 2011/0068651 A1 Mar. 24, 2011

(51) Int. Cl.
*H02K 21/12* (2006.01)
*H02K 21/14* (2006.01)

(52) U.S. Cl.
CPC .............. *H02K 21/14* (2013.01); *H02K 21/12* (2013.01)
USPC ................................. 310/156.43; 310/156.53

(58) Field of Classification Search
CPC ............................... H02K 21/12; H02K 21/14
USPC ........................ 310/156.43, 156.53
IPC .......................... H02K 21/12, 21/14
See application file for complete search history.

(56) References Cited

U.S. PATENT DOCUMENTS

| | | | |
|---|---|---|---|
| 5,034,146 A | 7/1991 | Ohashi et al. | |
| 5,405,455 A | 4/1995 | Kusunoki et al. | |
| 6,359,359 B1 * | 3/2002 | Miura et al. | 310/156.43 |
| 7,559,996 B2 * | 7/2009 | Miyata et al. | 148/302 |
| 2004/0046469 A1 * | 3/2004 | Oshima et al. | 310/156.21 |
| 2006/0213582 A1 * | 9/2006 | Nakamura et al. | 148/302 |
| 2007/0017601 A1 | 1/2007 | Miyata et al. | |
| 2008/0007131 A1 * | 1/2008 | Cai et al. | 310/156.38 |

(Continued)

FOREIGN PATENT DOCUMENTS

| | | | |
|---|---|---|---|
| JP | 5-21218 A | 1/1993 | |
| JP | 5031807 A | 5/1993 | |

(Continued)

OTHER PUBLICATIONS

Fitzgerald et al "Electric Machinery", McGraw Hill, 1990.*

(Continued)

*Primary Examiner* — John K Kim
(74) *Attorney, Agent, or Firm* — Westerman, Hattori, Daniels & Adrian, LLP

(57) ABSTRACT

In connection with a permanent magnet rotary machine comprising a rotor comprising a rotor core and a plurality of permanent magnet segments embedded in the rotor core and a stator comprising a stator core having a plurality of slots and windings therein, the rotor and the stator being disposed to define a gap therebetween, or a permanent magnet rotary machine comprising a rotor comprising a rotor core and a plurality of permanent magnet segments mounted on the surface of the rotor core and a stator comprising a stator core having a plurality of slots and windings therein, the rotor and the stator being disposed to define a gap therebetween, the rotor wherein each of the permanent magnet segments is an assembly of further divided permanent magnet pieces, and the coercive force near the surface of the magnet piece is higher than that in the interior of the magnet piece.

17 Claims, 12 Drawing Sheets

(56) References Cited

U.S. PATENT DOCUMENTS

| | | | |
|---|---|---|---|
| 2008/0054736 A1 | 3/2008 | Miyata et al. | |
| 2008/0245442 A1 | 10/2008 | Nakamura et al. | |
| 2010/0171386 A1* | 7/2010 | Kogure et al. | 310/156.43 |
| 2011/0068651 A1* | 3/2011 | Miyata et al. | 310/156.43 |

FOREIGN PATENT DOCUMENTS

| | | |
|---|---|---|
| JP | 2005-269693 A | 9/2005 |
| JP | 2005-354899 A | 12/2005 |
| JP | 2007-53351 A | 3/2007 |
| WO | 2006/043348 A1 | 4/2006 |
| WO | 2007-119271 A1 | 10/2007 |
| WO | 2008-146937 A1 | 12/2008 |

OTHER PUBLICATIONS

K. D. Durst et al; "The Coercive Field of Sintered and Melt-Spun NdFeB Magnets"; Journal of Magnetism and Magnetic Materials, vol. 68, (1987), pp. 63-75.

K. T. Park, et al.; "Effect of Metal—Coating and Consecutive Heat Treatment on Coercivity of Thin Nd-Fe-B Sintered Magnets"; Proceedings of the Sixteenth International Workshop on Rare—Earth Magnets and Their Application, (2000) pp. 257-264.

K. Machida et al.; "Grain Boundary Tailoring of Sintered Nd-Fe-B Magnets and Their Magnetic Properties"; Abstracts of Spring Meeting of Japan Society of Powder and Powder Metallurgy, 2004, p. 202.

Yasuaki Aoyama et al.; "Evaluation of the Alternating magnetic Loss in Divided Nd-Ne-B Sintered Magnet"; The papers of Joint Technical Meeting on Static Apparatus and Rotating Machinery, The Institute of Electrical Engineers of Japan, SA-06-83 and RM-06-85, Aug. 25, 2006, pp. 40-46.

Koji Miyata et al.; "Evaluating Demagnetization Loss in Surface Permanent Magnet Motor Utilizing Coercivity Distribution Magnets Produced by Grain Boundary Diffusion Process"; The papers of Technical Meeting on Rotating Machinery, IEE Japan, The institute of Electrical Engineers of Japan, RM-08-123, Nov. 13, 2008, pp. 90-96.

Brad Lucas; "Enhancing Performance of NdFeb Magnets using the Grain Boundary Diffusion Process (GBDP) and their Effective Application"; Magnetics Conference 2009, Apr. 15-16, 2009.

Takehisa Minowa; "Development of High Performance Nd Magnets using the Grain Boundary Diffusion Process"; Rare Earth Magnets, Magnetic Applied-Technology Symposium 2008, Apr. 16, 2008.

Hajime Nakamura; "Enhancing Performance of Nd-Fe-B Sintered Magnets by the Grain Boundary Diffusion Process"; Magnetic Applied-Technology Symposium 2009, Apr. 16, 2009.

International Search Report of PCT/JP2009/065740, dated of mailing Dec. 8, 2009.

Clients letter listing cited nonpatent literature documents.

Japanese Office Action dated Jun. 6, 2012, issued in corresponding Japanese Patent Application No. 2008-097797, (2 pages).

* cited by examiner

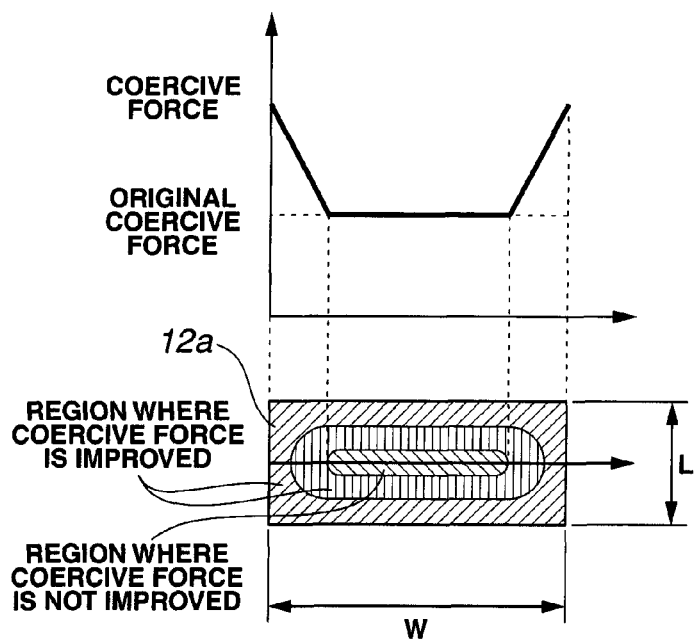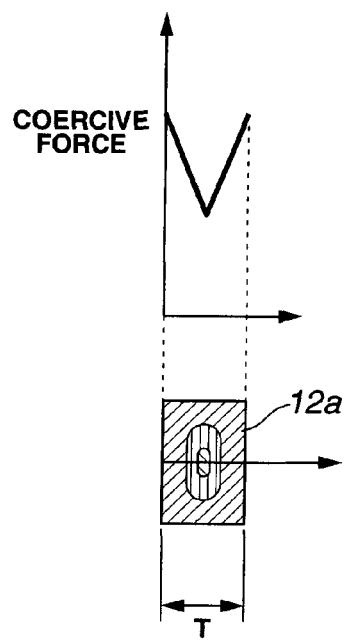
FIG.4A
FIG.4B

MAGNETIZATION DIRECTION M

12

12a

EDDY CURRENT

TEMPERATURE

L

SHAFT CENTER SIDE   STATOR SIDE

FIG.7A
FIG.7B
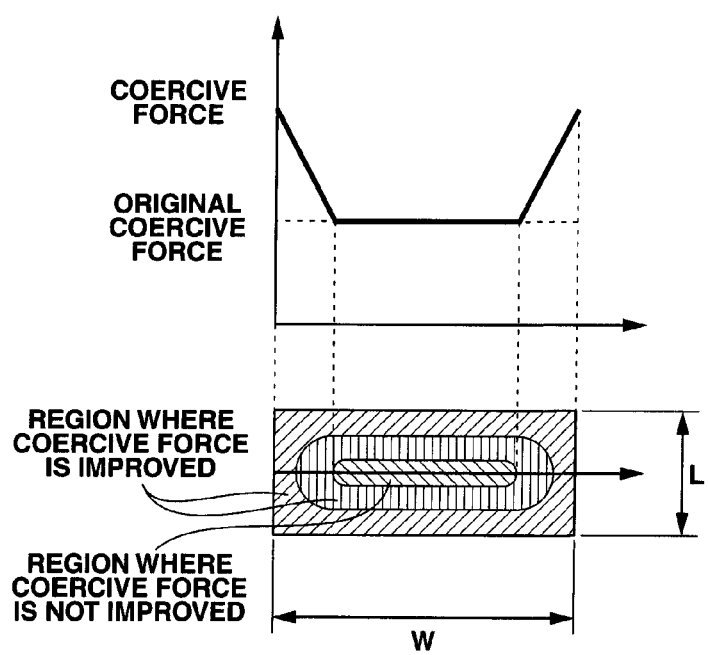
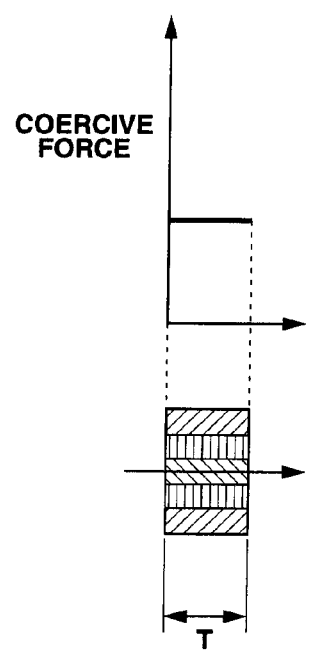

MAGNETIZATION DIRECTION
EDDY CURRENT

TEMPERATURE

ROTOR YOKE FACE   GAP FACE (STATOR SIDE)

ROTOR FOR PERMANENT MAGNET ROTATING MACHINE

BACKGROUND OF INVENTION

1. Technical Field

This invention relates to a rotor for use in a permanent magnet rotary machine comprising a rotor comprising a rotor core and a plurality of permanent magnet segments embedded in the rotor core and a stator comprising a stator core having a plurality of slots and windings therein, the rotor and the stator being disposed to define a gap therebetween (generally referred to as interior permanent magnet (IPM) rotary machine), or a rotor for use in a permanent magnet rotary machine comprising a rotor comprising a rotor core and a plurality of permanent magnet segments mounted on the surface of the rotor core and a stator comprising a stator core having a plurality of slots and windings therein, the rotor and the stator being disposed to define a gap therebetween (generally referred to as surface permanent magnet (SPM) rotary machine), and more particularly, to a rotor for use in a permanent magnet structure rotary machine best suited as electric vehicle motors, power generators, and FA motors capable of high speed rotation.

2. Background Art

Sintered Nd-base magnets have a growing range of application due to their excellent magnetic properties. Also in the field of rotary machines including motors and power generators, permanent magnet rotary machines utilizing sintered Nd-base magnets were developed to meet the recent demand for size, profile and weight reductions, performance enhancement and energy saving. Since IPM rotary machines of the structure wherein magnet parts are embedded within the rotor can utilize not only the torque by magnetization of the magnet, but also the reluctance torque by magnetization of the rotor yoke, research efforts have been made thereon as high-performance rotary machines. These rotary machines have a high level of mechanical safety in that throw-out of magnet parts by centrifugal force during rotation is prohibited since magnet parts are embedded within the rotor yoke made of silicon steel sheets or the like, and are capable of high-torque operation or operation at widely varying speeds by control of current phase, offering energy-saving, high-efficiency and high-torque motors. In these years, the IPM rotary machines find rapid widespread utilization as motors and power generators in electric vehicles, hybrid automobiles, high-performance air conditioners, industrial tools, and trains.

SPM rotary machines of the structure wherein magnet parts are attached to the surface of the rotor have advantages including efficient utilization of the strong magnetism of Nd base magnets, good linearity of motor torque, and ease of control. An optimized shape of magnet parts leads to motors with a minimal cogging torque. They are used as controlling motors in some electric vehicles, power steering systems, and the like.

Permanent magnets are situated in rotary machines such that they are exposed to high temperature due to the heat generated by windings and cores and have a likelihood of demagnetization by the diamagnetic field from the windings. There thus exists a demand for sintered Nd base magnets in which the coercive force which is an index of heat resistance and demagnetization resistance is above a certain level and the remanence (or residual magnetic flux density) which is an index of the magnitude of magnetic force is as high as possible.

Further, sintered Nd base magnets are conductors having an electric resistance of 100 to 200 μΩ-cm. As the rotor rotates, the magnet undergoes a variation of magnetic flux density, by which eddy currents flow. Effective means for reducing eddy currents is to divide a magnet body to interrupt the eddy current path. While division of a magnet body into smaller pieces leads to a more reduction of eddy current loss, it becomes necessary to take into account such problems as an increase of manufacturing cost and a lowering of output due to a reduction of magnet volume by increased interstices.

The eddy current path runs in a plane perpendicular to the magnetization direction of a magnet, with a higher current density prevailing in an outer peripheral portion. The current density is also higher at a side closer to the stator. That is, the amount of heat generated by eddy currents is greater near the magnet surface, so that the magnet surface region assumes a higher temperature and becomes prone to demagnetization. To suppress demagnetization by eddy currents, a sintered Nd base magnet in which the coercive force which is an index of demagnetization resistance is higher in the magnet surface region than in the magnet interior is required.

Several measures are known to improve coercive force. An increase in the remanence of sintered Nd base magnet is achieved by increases in the volume fraction of $Nd_2Fe_{14}B$ compound and the degree of crystal orientation, and various improvements in process have been made therefor. As to an increase in coercive force, there are known various approaches including formation of crystal grains of finer size, use of an alloy composition having an increased Nd content, and addition of an effective element. Of these, the currently most common approach is the use of an alloy composition having Dy or Tb substituted for part of Nd. By substituting such elements for Nd of $Nd_2Fe_{14}B$ compound, the compound is increased in anisotropic magnetic field as well as coercive force. On the other hand, the substitution of Dy or Tb decreases the saturation magnetic polarization of the compound. Accordingly, the attempt to increase the coercive force by the above approach fails to avoid a lowering of remanence.

In sintered Nd base magnets, the coercive force is given by the magnitude of an external magnetic field created by nuclei of reverse magnetic domains at grain boundaries. Formation of nuclei of reverse magnetic domains is largely dictated by the structure of the grain boundary in such a manner that any disorder of grain structure in proximity to the boundary invites a disturbance of magnetic structure, helping formation of reverse magnetic domains. It is generally believed that a magnetic structure extending from the grain boundary to a depth of about 5 nm contributes to an increase of coercive force (See K. D. Durst and H. Kronmuller, "THE COERCIVE FIELD OF SINTERED AND MELT-SPUN NdFeB MAGNETS," Journal of Magnetism and Magnetic Materials, 68 (1987), 63-75).

The inventors found that by concentrating trace Dy or Tb only in proximity to the grain boundaries to increase the anisotropic magnetic field only in proximity to the boundaries, the coercive force can be increased while suppressing any decline of remanence (see JP-B 5-31807). Subsequently, the inventors established a production method comprising separately preparing a $Nd_2Fe_{14}B$ compound composition alloy and a Dy or Tb-rich alloy, mixing them and sintering the mixture (see JP-A 5-21218). In this method, the Dy or Tb-rich alloy becomes a liquid phase during the sintering and is distributed so as to surround the $Nd_2Fe_{14}B$ compound. As a consequence, substitution of Dy or Tb for Nd occurs only in proximity to grain boundaries in the compound, so that the coercive force can be effectively increased while suppressing any decline of remanence.

However, since the two types of alloy fine powders in the mixed state are sintered at a temperature as high as 1,000 to 1,100° C., the above-described method has a likelihood that Dy or Tb diffuses not only to the boundaries, but also into the interior of $Nd_2Fe_{14}B$ grains. An observation of the structure of an actually produced magnet shows that Dy or Tb has diffused to a depth of about 1 to 2 μm from the boundary in a grain boundary surface layer, the diffused area reaching 60% or more, calculated as volume fraction. As the distance of diffusion into grains becomes longer, the concentration of Dy or Tb near the boundaries becomes lower. An effective measure for positively suppressing the excessive diffusion into grains is by lowering the sintering temperature. However, this measure cannot be practically acceptable because it compromises densification by sintering. An alternative method of sintering at lower temperatures while applying stresses by means of a hot press or the like enables densification, but poses the problem of extremely reduced productivity.

On the other hand, it is reported that coercive force can be increased by machining a sintered magnet to a small size, applying Dy or Tb on the magnet surface by sputtering, and heat treating the magnet at a temperature lower than the sintering temperature, thereby causing Dy or Tb to diffuse only to grain boundaries (see K. T. Park, K. Hiraga and M. Sagawa, "Effect of Metal-Coating and Consecutive Heat Treatment on Coercivity of Thin Nd—Fe—B Sintered Magnets," Proceedings of the Sixteen International Workshop on Rare-Earth Magnets and Their Applications, Sendai, p. 257 (2000); and K. Machida, H. Kawasaki, T. Suzuki, M. Ito and T. Horikawa, "Grain Boundary Tailoring of Sintered Nd—Fe—B Magnets and Their Magnetic Properties," Proceedings of the 2004 Spring Meeting of the Powder & Powder Metallurgy Society, p. 202). These methods allow for more effective concentration of Dy or Tb at grain boundaries and succeed in increasing the coercive force without a substantial loss of remanence. As the magnet becomes larger in specific surface area, that is, the magnet body becomes smaller, the amount of Dy or Tb fed becomes larger, indicating that this method is applicable to only compact or thin magnets. However, there is still left the problem of poor productivity associated with the deposition of metal coating by sputtering or the like.

WO 2006/043348 discloses means for efficiently improving coercive force which has solved the foregoing problems and lends itself to mass-scale production. When a sintered $R^1$—Fe—B magnet body, typically sintered Nd base magnet body, is heated in the presence of a powder on its surface, the powder comprising one or more of $R^2$ oxides, $R^3$ fluorides, and $R^4$ oxyfluorides wherein each of $R^1$ to $R^4$ is one or more elements selected from among rare earth elements inclusive of Y and Sc, $R^2$, $R^3$ or $R^4$ contained in the powder is absorbed in the magnet body, whereby coercive force is increased while significantly suppressing a decline of remanence. Particularly when $R^3$ fluoride or $R^4$ oxyfluoride is used, $R^3$ or $R^4$ is efficiently absorbed in the magnet body along with fluorine, resulting in a sintered magnet having a high remanence and a high coercive force.

SUMMARY OF INVENTION

An object of the present invention which has been made in view of the above-discussed circumstances is to provide a rotor for use in a permanent magnet rotary machine having a high output and heat resistance.

Making extensive investigations to attain the above object, the inventors have found that in an IPM or SPM rotary machine using a plurality of permanent magnet segments, better results are obtained when each of the permanent magnet segments is constructed as an assembly of further divided permanent magnet pieces (simply referred to as magnet pieces), and the coercive force or heat resistance near the surface of the magnet piece is higher than that in the interior of the magnet piece. In this connection, the inventors presumed that the method of Machida et al. and the method of WO 2006/043348 are suited for high-output rotary machines because of no loss of remanence, and since the coercive force near the surface of magnet pieces can be increased, the magnet pieces, when used in rotors in IPM or SPM rotary machines, are expected to minimize demagnetization due to heat generation by eddy currents. The inventors have found that application of such a method to individual magnet pieces of the permanent magnet assembly is effective in achieving the object of the invention, especially that a sintered Nd base magnet is used and divided into pieces for minimizing the heat generation by eddy currents, that the magnet pieces are used as the magnet for a rotor in a permanent magnet rotary machine, typically IPM or SPM rotary machine, and that magnet pieces in which the coercive force near their surface is higher than that in their interior, and in which heat resistance near their surface is improved are effective for use in a rotor in a permanent magnet rotary machine, typically IPM or SPM rotary machine.

More particularly, the inventors have found the following. When a permanent magnet rotary machine is loaded with magnet pieces into which a magnet has been divided for minimizing the heat generation by eddy current, the magnet pieces display a locally elevated temperature near their surface due to eddy current heat generation. For enhancing the heat resistance of magnet, it is effective to increase the coercive force near the surface of magnet whose temperature becomes elevated. Particularly for enhancing the coercive force near the surface of magnet, it is effective to use a sintered Nd base magnet having a coercive force profile from the surface toward the interior that is created by letting Dy or Tb diffuse from the magnet surface toward the interior. The diffusion of Dy or Tb from the surface toward the interior of magnet takes place mainly via grain boundaries. For example, the method of applying a Dy or Tb oxide powder, Dy or Tb fluoride powder or Dy or Tb-containing alloy powder to the magnet surface and letting Dy or Tb diffuse at a high temperature is effective as the diffusion reaction of Dy or Tb from the surface toward the interior of magnet. The present invention is predicated on these findings.

Accordingly, the present invention provides a rotor for permanent magnet rotary machines, and a permanent magnet rotary machine, which are defined below.

Claim 1:

In connection with a permanent magnet rotary machine comprising a rotor comprising a rotor core and a plurality of permanent magnet segments embedded in the rotor core and a stator comprising a stator core having a plurality of slots and windings therein, the rotor and the stator being disposed to define a gap therebetween, or a permanent magnet rotary machine comprising a rotor comprising a rotor core and a plurality of permanent magnet segments mounted on the surface of the rotor core and a stator comprising a stator core having a plurality of slots and windings therein, the rotor and the stator being disposed to define a gap therebetween, the rotor wherein each of said permanent magnet segments is an assembly of further divided permanent magnet pieces, each of the divided permanent magnet pieces has a coercive force at a surface and an interior, and the coercive force near the surface of the magnet piece is higher than that in the interior of the magnet piece.

Claim 2:

In connection with a permanent magnet rotary machine comprising a rotor comprising a rotor core and a plurality of permanent magnet segments embedded in the rotor core and a stator comprising a stator core having a plurality of slots and windings therein, the rotor and the stator being disposed to define a gap therebetween, or a permanent magnet rotary machine comprising a rotor comprising a rotor core and a plurality of permanent magnet segments mounted on the surface of the rotor core and a stator comprising a stator core having a plurality of slots and windings therein, the rotor and the stator being disposed to define a gap therebetween, the rotor wherein each of said permanent magnet segments is an assembly of further divided permanent magnet pieces, each of the divided permanent magnet pieces has heat resistance at a surface and an interior, and the heat resistance near the surface of the magnet piece is higher than that in the interior of the magnet piece.

Claim 3:

The rotor for a permanent magnet rotary machine of claim 1 wherein the magnet pieces are of a sintered Nd base rare earth magnet.

Claim 4:

The rotor for a permanent magnet rotary machine of claim 3 wherein each piece of sintered Nd base rare earth magnet has a coercive force profile from the surface toward the interior, which is created by letting Dy or Tb diffuse from the surface toward the interior of the magnet piece.

Claim 5:

The rotor for a permanent magnet rotary machine of claim 3 wherein each piece of sintered Nd base rare earth magnet has a coercive force profile from the surface toward the interior, which is created by letting Dy or Tb diffuse from the surface toward the interior of the magnet piece mainly via grain boundaries.

Claim 6:

The rotor for a permanent magnet rotary machine of claim 4 wherein the step of letting Dy or Tb diffuse from the surface toward the interior of the sintered Nd base rare earth magnet piece includes applying a Dy or Tb oxide powder, a Dy or Tb fluoride powder or a Dy or Tb-containing alloy powder to surfaces of the magnet piece, then holding the magnet piece at a high temperature sufficient to diffuse Dy or Tb.

The invention is successful in providing a permanent magnet rotary machine having a high output and heat resistance, the rotor of the machine being loaded with a permanent magnet, typically a sintered Nd base magnet, which has been divided into magnet pieces having a high remanence and a high coercive force, especially at an outer peripheral portion thereof, suited for use in rotors in IPM or SPM rotary machines.

BRIEF DESCRIPTION OF ACCOMPANYING DRAWINGS

FIG. 4 illustrates the coercive force distribution in the magnet piece of FIG. 3A, FIG. 4A being in side surface, and FIG. 4B being in end surface.

FIG. 7 illustrates the coercive force distribution in the magnet piece of FIG. 6A, FIG. 7A being in side surface, and FIG. 7B being in end surface.

DESCRIPTION OF EMBODIMENTS

The invention relates to a permanent magnet rotary machine comprising a rotor comprising a rotor core and a plurality of permanent magnet segments embedded in the rotor core and a stator comprising a stator core having a plurality of slots and windings therein, the rotor and the stator being disposed to define a gap therebetween, or a permanent magnet rotary machine comprising a rotor comprising a rotor core and a plurality of permanent magnet segments mounted on the surface of the rotor core and a stator comprising a stator core having a plurality of slots and windings therein, the rotor and the stator being disposed to define a gap therebetween (generally referred to as SPM rotary machine). The invention provides the rotor wherein each of the permanent magnet segments is an assembly of further divided permanent magnet pieces (simply referred to as magnet pieces), each of the magnet pieces has a coercive force or heat resistance at a surface and an interior, and the coercive force or heat resistance near the surface of the magnet piece is higher than the coercive force or heat resistance in the interior of the magnet piece.

Figure 1:
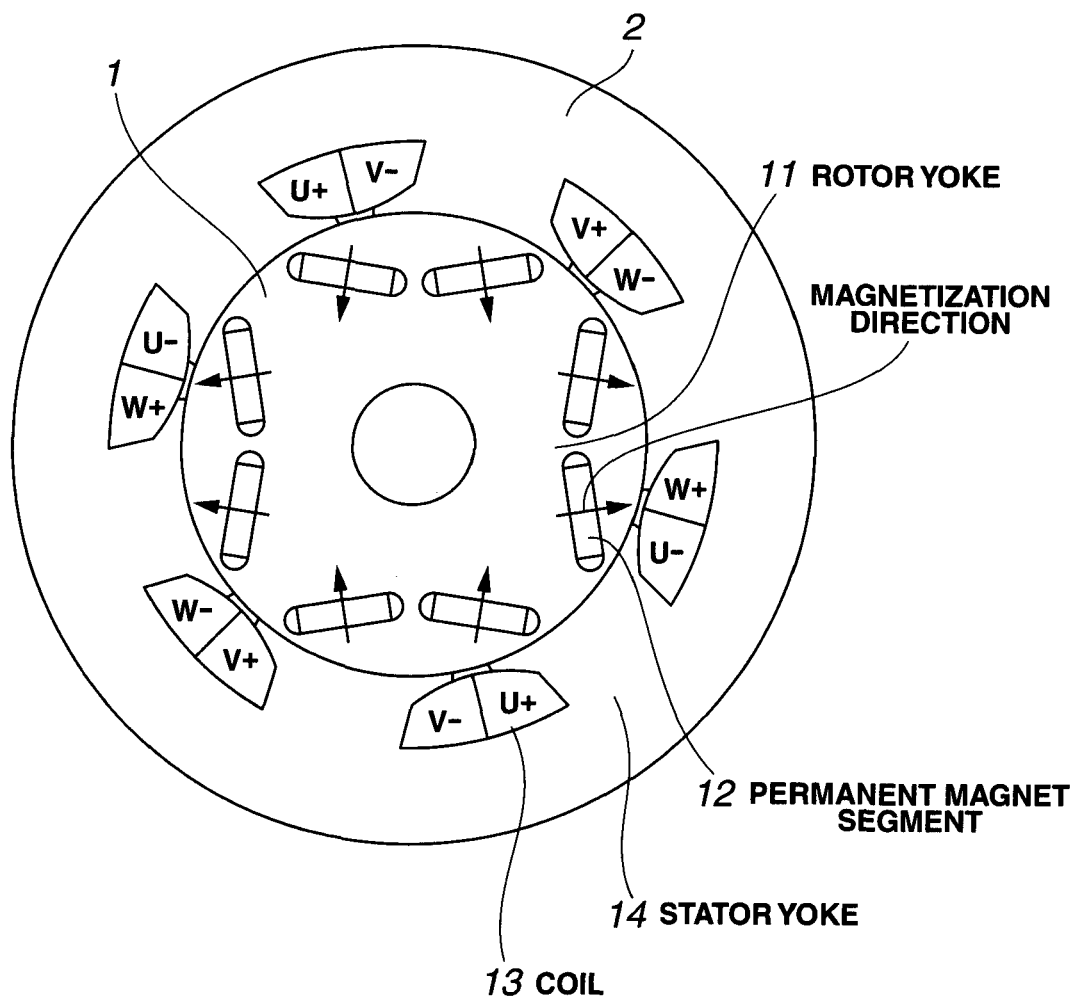
FIG. 1 is a cross-sectional view of one exemplary IPM motor of 4 poles/6 slots according to the invention.

FIG. 1 illustrates an exemplary IPM rotary machine. The machine in FIG. 1 includes a rotor 1 and a stator 2. The rotor 1 has a four-pole structure comprising a rotor yoke 11 of laminated magnetic steel sheets and permanent magnet segments 12 embedded therein. Instead, simple rectangular magnet parts may be disposed at four poles. The number of poles is selected in accordance with a particular purpose of the rotary machine. The stator 2 has a six-slot structure of laminated magnetic steel sheets, with a coil 13 concentratedly wound on each teeth. The coil 13 is of a three-phase Y-connection of U, V and W phases. Also shown in FIG. 1 is a stator yoke 14. In FIG. 1, the symbols "+" and "−" attached to U, V and W indicate winding directions of coils, with "+" indicating a direction emerging from the plane of sheet and "−" indicating an entering direction. While the rotor and stator are positioned as shown in FIG. 1, an alternating current of cosine wave flows as the U phase, an alternating current having a 120° lead phase relative to the U phase flows as the V phase, and an alternating current having a 240° lead phase relative to the U phase flows as the W phase. Then the rotor rotates counter-clockwise by the interaction between the magnetic flux of permanent magnets and the magnetic flux of coils. In FIG. 1, the arrow associated with each permanent magnet segment 12 indicates a magnetization direction.

Figure 3A:
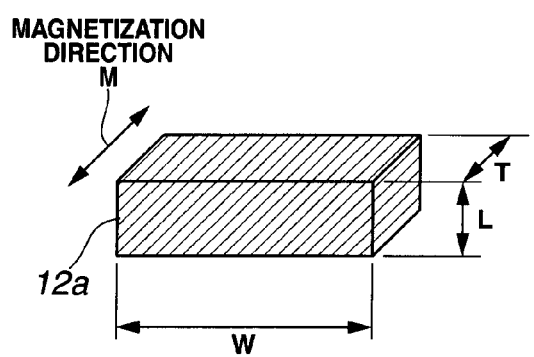
FIG. 3 illustrates one exemplary permanent magnet segment for use in the IPM motor according to the invention, FIG. 3A being a perspective view of a magnet piece which has undergone diffusion treatment with Dy or Tb from all surfaces, FIG. 3B being a perspective view of an assembly of such magnet pieces.
Figure 3B:
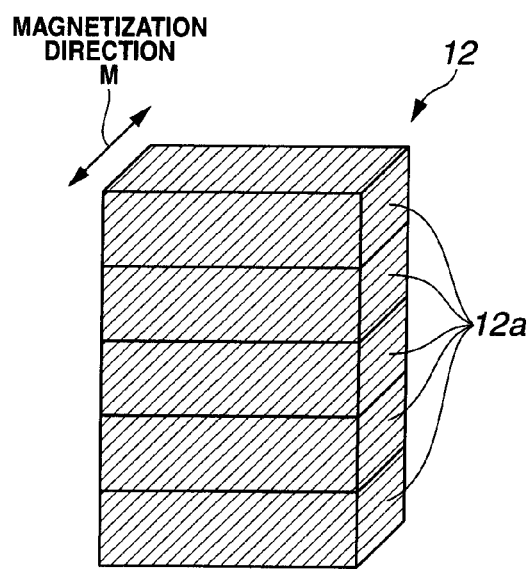

According to the invention, the permanent magnet segment 12 is an assembly of a plurality of further divided permanent magnet pieces 12a as shown in FIG. 3B, for example.

The magnet pieces 12a are preferably of sintered Nd base rare earth magnet. The sintered Nd base rare earth magnet used herein may be one obtained by coarsely pulverizing a mother alloy, finely pulverizing, compacting and sintering in a standard way. As mentioned above, the invention uses a discrete sintered magnet in which a coercive force or heat resistance near the surface thereof is higher than a coercive force or heat resistance in the interior thereof, which can be produced by letting Dy or Tb diffuse from the magnet surface toward the interior, and mainly via grain boundaries. More specifically, use is made of a magnet piece which is obtained by a procedure including depositing Dy or Tb on surfaces of a magnet piece by sputtering and heat treating the magnet piece at a temperature lower than the sintering temperature, thereby letting Dy or Tb diffuse only to grain boundaries, or another procedure including applying a powder of Dy or Tb oxide, fluoride or oxyfluoride to surfaces of a magnet piece and heat treating the magnet piece and powder in vacuum or inert gas at a temperature lower than the sintering temperature.

More preferably, the desired magnet piece may be obtained by applying a Dy or Tb oxide powder, Dy or Tb fluoride powder or Dy or Tb-containing alloy powder to surfaces of a magnet piece and then holding the magnet piece at a high temperature for letting Dy or Tb diffuse.

Figure 2A:
FIGS. 2A, 2B and 2C are cross-sectional views of exemplary magnet pieces which constitute a permanent magnet assembly in the IPM motor.
Figure 2B:
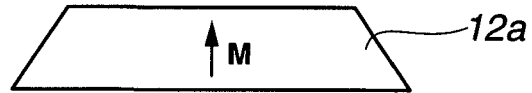
Figure 2C:
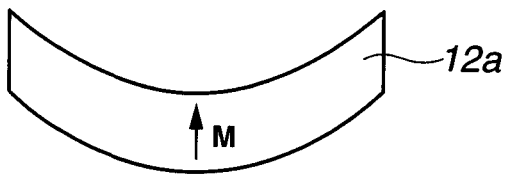

The permanent magnet (magnet piece) for use in the IPM rotary machine is obtained by machining a sintered magnet block into a predetermined shape using a grinding wheel, machining blade, wire saw or the like. The cross-sectional shape of the magnet piece is often a rectangular shape as shown in FIG. 2A from the standpoint of ease of working, although the magnet piece may be of a trapezoidal or arcuate shape as shown in FIG. 2B or 2C for the purpose of improving the performance of the rotary machine. It is noted that in FIG. 2, the arrow indicates a magnetization direction M.

The size of a magnet piece is not particularly limited. For diffusion treatment of a magnet piece with Dy or Tb, the proportion of diffusion of Dy or Tb increases as the specific surface area of a magnet piece becomes larger, i.e., the size of a magnet piece becomes smaller. It is then preferred that in FIGS. 3A, 6A, and 10A, the smallest one of dimensions W, L, and T is up to 50 mm, more preferably up to 30 mm, and most preferably up to 20 mm. The lower limit of this dimension is not critical although it is practically at least 0.1 mm.

Figure 10A:
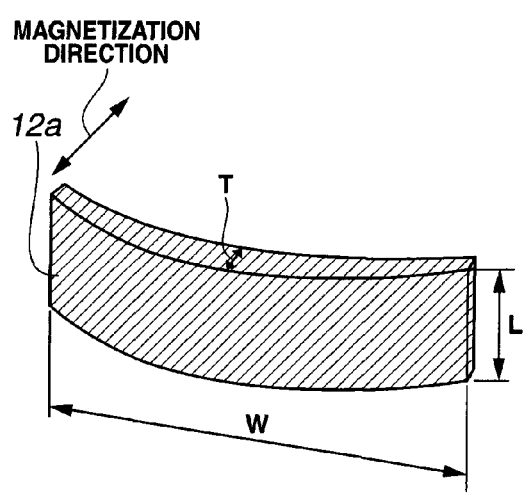
FIG. 10 illustrates one exemplary permanent magnet segment for use in the SPM motor according to the invention, FIG. 10A being a perspective view of a magnet piece which has undergone diffusion treatment with Dy or Tb from all surfaces, FIG. 10B being a perspective view of an assembly of such magnet pieces.
Figure 10B:
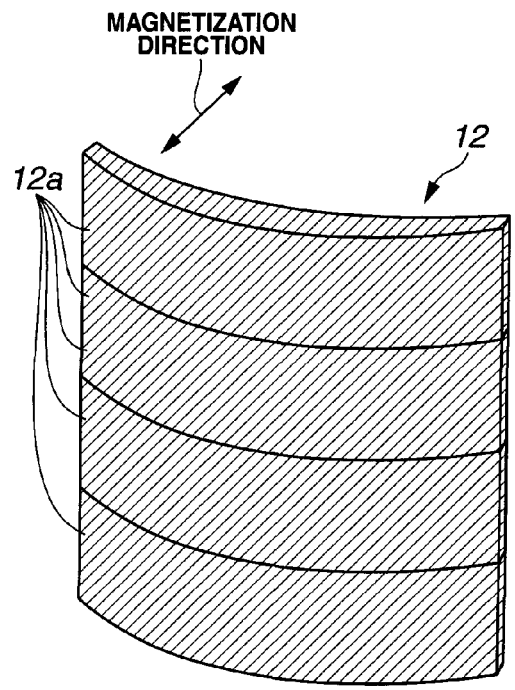
Figure 12A:
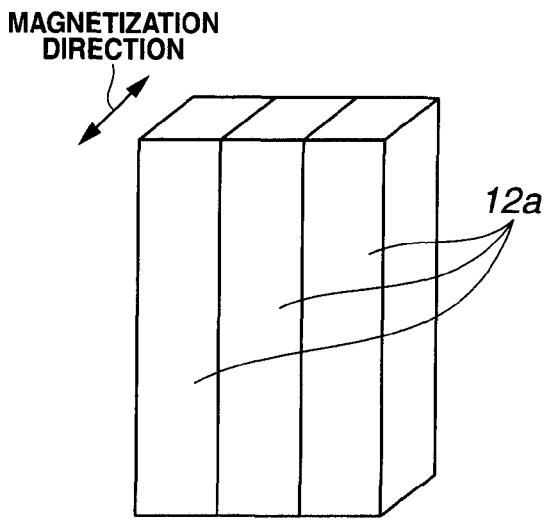
FIGS. 12A, 12B and 12C are perspective views of different permanent magnet assemblies.
Figure 12B:
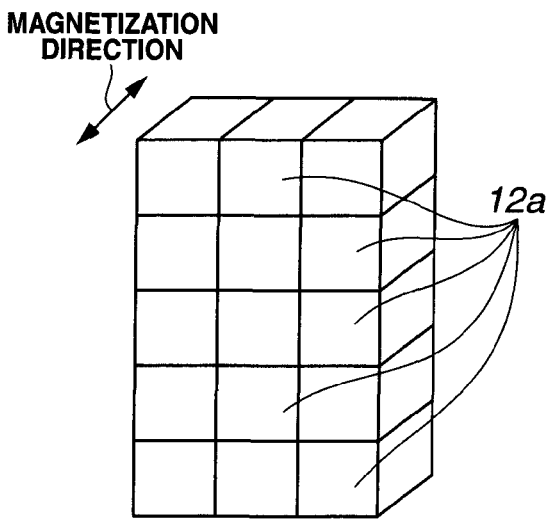
Figure 12C:
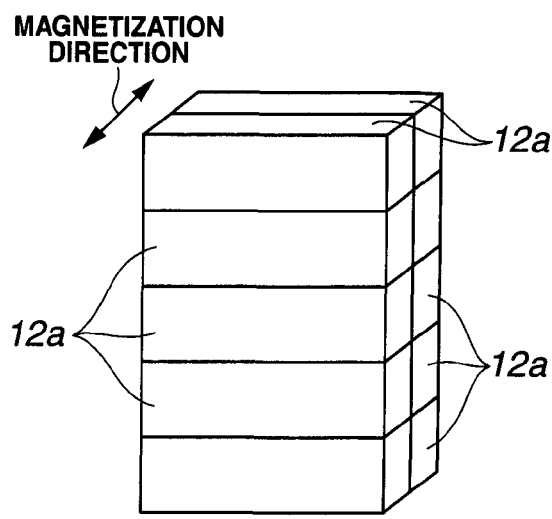

According to the invention, a starting magnet block is machined so that a permanent magnet body may have the desired properties, thus forming magnet pieces. The number of division of a permanent magnet segment is in the range of 2 to 50 divisions, preferably 4 to 25 divisions, and divided magnet pieces are bonded with an adhesive to form an assembly. The assembly may be any of various embodiments including an assembly constructed by stacking a plurality of magnet pieces 12a of parallelepiped or curved plate shape, with their W direction (axial or longitudinal direction) aligned with a horizontal direction, as shown in FIGS. 3B, 6B, and 10B; an assembly constructed by disposing magnet pieces 12a of parallelepiped shape with their axial direction aligned with a vertical direction, juxtaposing a plurality of such magnet pieces in a row, and integrating them, as shown in FIG. 12A; an assembly constructed by stacking a plurality of magnet pieces 12a of cubic shape in a perpendicular direction, juxtaposing such stacks in a row in a transverse direction, and integrating them, as shown in FIG. 12B; and an assembly constructed by juxtaposing two stacks each consisting of magnet pieces of parallelepiped shape stacked as shown in FIG. 3B, and integrating them, as shown in FIG. 12C. The assembly is not limited to the illustrated embodiments.

The assembly of stacked magnet pieces is inserted into a bore in the rotor, constructing a magnet embedment rotor.

In the IPM rotary machine, the magnetic flux passing across the permanent magnet varies momentarily with rotation of the rotor, and this variation of magnetic field causes eddy currents to generate within the magnet. Eddy currents flow in a plane perpendicular to the magnetization direction of the magnet.

Figure 5A:
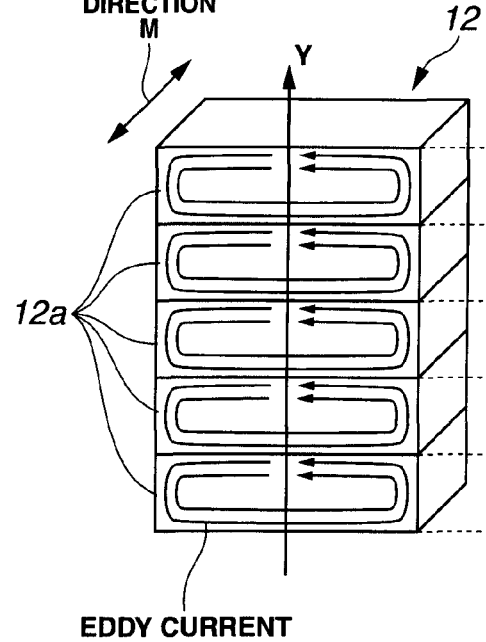
FIG. 5A illustrates how eddy currents flow in the permanent magnet assembly of FIG. 3B in an IPM motor.
Figure 5B:
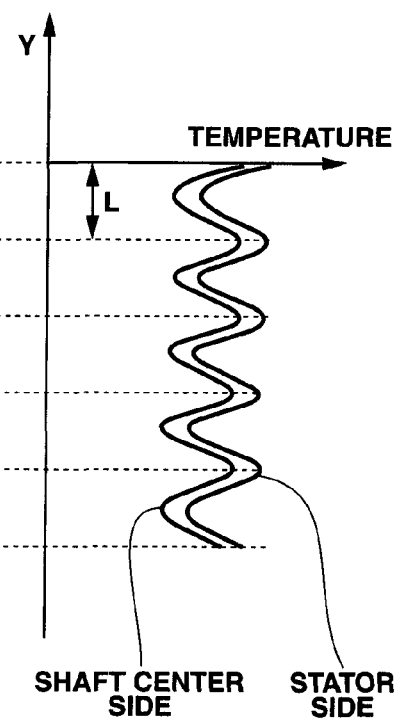
FIG. 5B illustrates the temperature distribution within the magnet pieces in the assembly.

Even in the magnet piece 12a, eddy currents flow in a plane perpendicular to the magnetization direction. The flow of eddy currents and the temperature distribution within the magnet pieces are summarized in the schematic view of FIG. 5. As seen from FIG. 5, the density of eddy current becomes higher at an outer peripheral portion of each magnet piece where the temperature rises. Since the magnetic field variation is greater on the stator side, the temperature distribution in the magnetization direction is slightly higher on the stator side than on the rotating shaft center side. To suppress demagnetization due to eddy currents, an Nd magnet piece is required in which the coercive force (serving as an index of demagnetization resistance) is higher near the surface of the magnet piece corresponding to the magnet outer peripheral portion than in the magnet interior. The magnet interior where less heat is generated by eddy currents does not need a more than necessity coercive force.

FIG. 3 illustrates an embodiment wherein Dy or Tb is diffused from all surfaces of magnet piece 12a as shown in FIG. 3A (the shaded zones are surfaces from which Dy or Tb is diffused), and five magnet pieces 12a having a thus increased coercive force near the surface thereof are integrated with an adhesive into an assembly as shown in FIG. 3B.

Figure 6A:
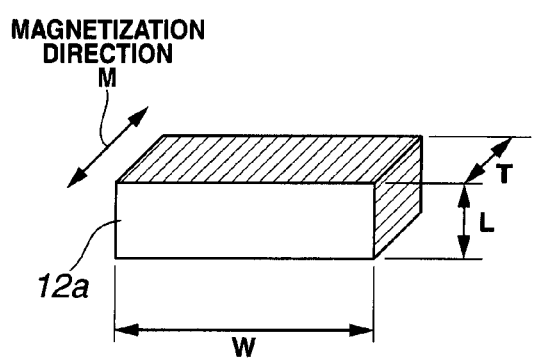
FIG. 6 illustrates another exemplary permanent magnet segment for use in the IPM motor according to the invention, FIG. 6A being a perspective view of a magnet piece which has undergone diffusion treatment with Dy or Tb from four surfaces parallel to the magnetization direction, FIG. 6B being a perspective view of an assembly of such magnet pieces.
Figure 6B:
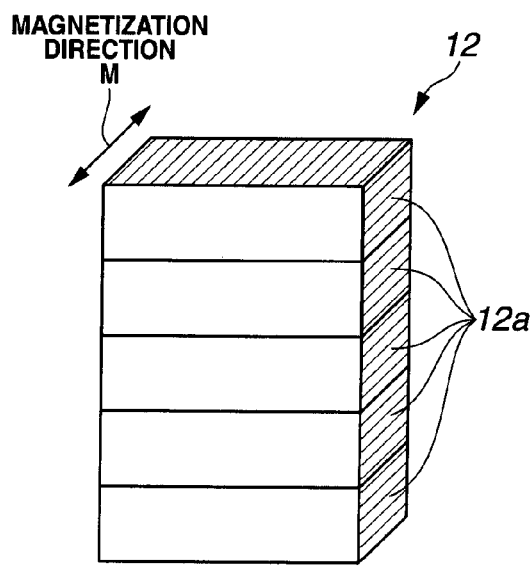
Figure 6B:
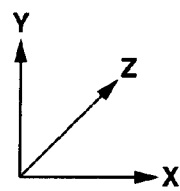

FIG. 6 illustrates an embodiment wherein absorption/diffusion treatment with Dy or Tb is performed from four surfaces of magnet piece 12a which extend parallel to the magnetization direction as shown in FIG. 6A (the shaded zones are surfaces from which Dy or Tb is diffused, and two non-shaded zones in X-Y plane are untreated), after which five magnet pieces 12a are integrated with an adhesive into an assembly as shown in FIG. 6B (the shaded zones are surfaces from which Dy or Tb is diffused). Even in the embodiment of FIG. 3 or 6, there are available Nd magnet pieces in which the coercive force (serving as an index of demagnetization resistance) is higher near the surface of the magnet piece corresponding to the magnet outer peripheral portion than in the magnet interior. As used herein, the term "near the surface" means a region which extends about 6 mm from the surface.

As a result of diffusion/absorption treatment with an element having an extraordinary effect of enhancing magnetocrystalline anisotropy, Dy or Tb from surfaces of a sintered Nd base magnet body, the coercive force of the sintered Nd base magnet is efficiently increased without a substantial loss of remanence. Thus the sintered magnet body has a coercive force distribution. FIG. 4 shows the coercive force distribution of a magnet piece which has undergone diffusion/absorption treatment from all surfaces thereof as shown in FIG. 3. The coercive force near the magnet surface is higher than that in the magnet interior. FIG. 7 shows the coercive force distribution of a magnet piece which has undergone diffusion/absorption treatment from four surfaces thereof parallel to the magnetization direction as shown in FIG. 6. The coercive force near the magnet surface is higher than that in the magnet interior, but the coercive forces near those surfaces perpendicular to the magnetization direction are not improved because of no diffusion/absorption from these surfaces. In the case of the IPM rotary machine, since the heat generation by eddy currents is especially high on those four surfaces (X-Z and Y-Z planes) parallel to the magnetization direction, even the coercive force distribution of FIG. 7 may improve heat resistance. Any of these embodiments is successful in increasing the coercive force near the magnet surface, providing a coercive force distribution effective for improving heat resistance against the heat generation by eddy currents.

Figure 8:
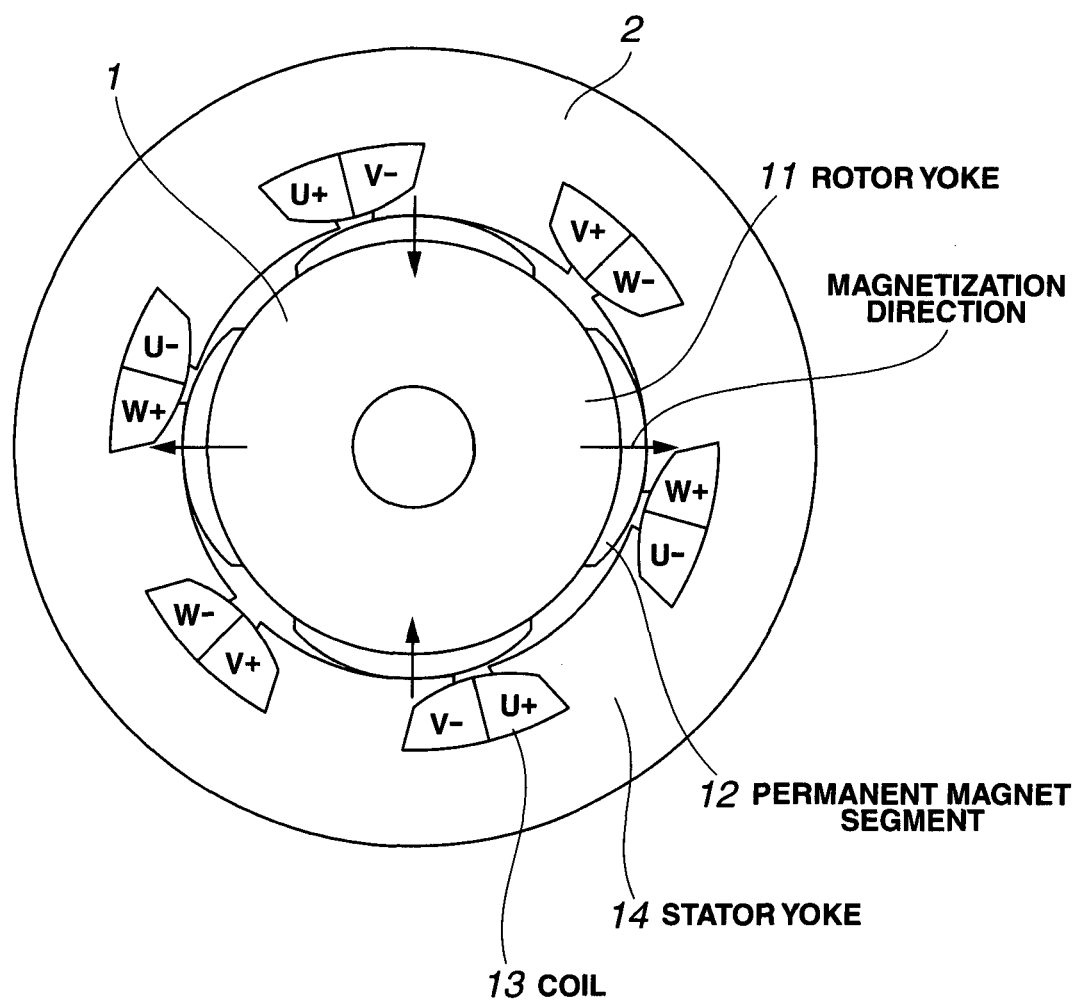
FIG. 8 is a cross-sectional view of one exemplary SPM motor of 4 poles/6 slots according to the invention.
Figure 9A:
FIGS. 9A, 9B and 9C are cross-sectional views of exemplary magnet pieces which constitute a permanent magnet assembly in the SPM motor.
Figure 9B:
Figure 9C:
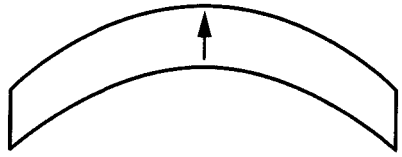

FIG. 8 illustrates an exemplary SPM rotary machine. The machine includes a rotor 1 comprising a rotor yoke 11 and a plurality of permanent magnet segments 12 attached to the surface thereof and a stator 2 having a plurality of slots, the rotor and the stator being disposed to define a gap therebetween. The stator 2 is the same as that of the IMP rotary machine. This rotary machine is utilized as AC servo motors and similar motors requiring high-precision torque control. The torque must be minimized in ripple. Accordingly, it is not preferable that the magnetic flux distribution in the gap varies with the positional relationship between the stator slot and the permanent magnet upon rotation of the rotor, to produce a cogging torque (torque with no current flow across the coils) and that torque ripples occur when electric current is flowed across the coils for driving. The torque ripples exacerbate controllability and cause noise. Used as means for reducing the cogging torque is a divided permanent magnet piece 12a of the shape that end portions are thinner than a central portion as shown in FIGS. 9C and 10A. Then the magnetic flux distribution becomes smooth at the magnet end portion which is a magnetic pole transition area having a large change of magnetic flux distribution, resulting in a reduction of cogging torque. Accordingly, a C-shaped magnet piece as shown in FIGS. 9C and 10A is often used while a D-shaped magnet piece as shown in FIG. 9B may also be used. Also acceptable from the standpoint of ease of fabrication is a rectangular magnet piece as shown in FIG. 9A.

Figure 11A:
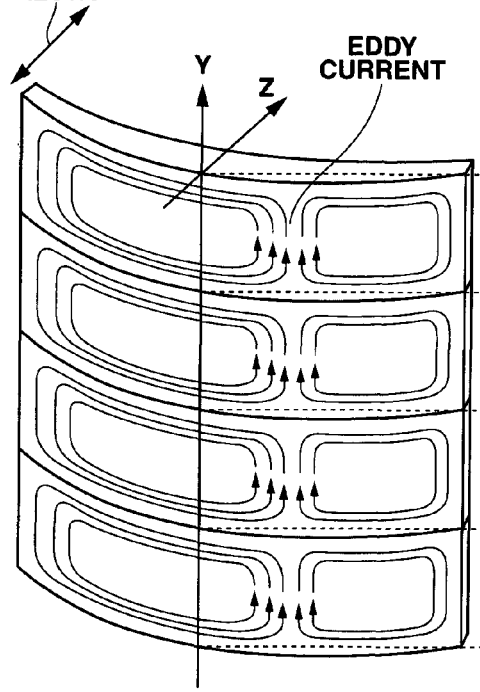
FIG. 11A illustrates how eddy currents flow in the permanent magnet assembly of FIG. 9B in an SPM motor.
Figure 11B:
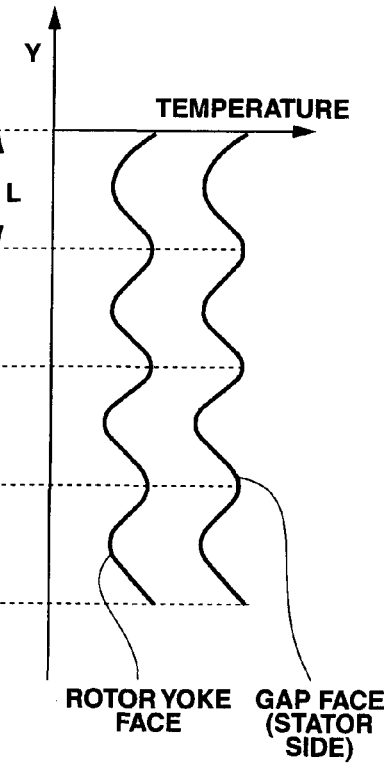
FIG. 11B illustrates the temperature distribution within the magnet pieces in the assembly.

Also in the SPM rotary machine, eddy currents flow in the permanent magnet. A magnet piece 12a as shown in FIG. 10A is effective for reducing eddy currents. FIG. 10B illustrates an assembly of adhesively integrated four magnet pieces 12a into which Dy or Tb has been diffused from surfaces thereof (the shaded zones are surfaces from which Dy or Tb are diffused). Even in the magnet piece 12a, eddy currents flow in a plane perpendicular to the magnetization direction. The flow of eddy currents and the temperature distribution within the magnet pieces are summarized in the schematic view of FIG. 11. As seen from FIG. 11, the density of eddy currents becomes higher at an outer peripheral portion of each magnet piece where the temperature rises. Since the magnetic field variation is greater on the stator side, the temperature distribution in the magnetization direction is higher on the stator side. The temperature distribution in the magnetization direction is greater than in the IPM motor. To suppress demagnetization due to eddy currents, the invention uses an Nd magnet piece in which the coercive force (serving as an index of demagnetization resistance) is higher near the surface of the magnet piece corresponding to the magnet outer peripheral portion and stator side than in the magnet interior.

As in the case of IPM rotary machine, diffusion/absorption treatment with an element having an effect of enhancing magnetocrystalline anisotropy, Dy or Tb from surfaces of a sintered Nd base magnet results in a magnet piece having an increased coercive force near the surface thereof without a concomitant substantial loss of remanence. Thus a rotor for SPM rotary machine having improved heat resistance is provided.

EXAMPLE

Examples are given below for illustrating some embodiments of the present invention, but the scope of the invention is not limited thereby.

Examples and Comparative Examples

Magnetic Properties of Examples and Comparative Examples

A thin plate of alloy was prepared by a so-called strip casting technique, specifically by weighing predetermined amounts of Nd, Co, Al and Fe metals having a purity of at least 99% by weight and ferroboron, high-frequency heating in an argon atmosphere for melting, and casting the alloy melt on a copper single roll in an argon atmosphere. The resulting alloy was composed of 13.5 atom % Nd, 1.0 atom % Co, 0.5 atom % Al, 5.8 atom % B, and the balance of Fe and is designated Alloy A. Alloy A was hydrided and then heated at 500° C. for partial dehydriding while evacuating to vacuum. By this so-called hydriding pulverization, the alloy was pulverized into a coarse powder having a size of up to 30 mesh. Another alloy was prepared by weighing predetermined amounts of Nd, Tb, Fe, Co, Al and Cu metals having a purity of at least 99% by weight and ferroboron, high-frequency heating in an argon atmosphere for melting, and casting. The resulting alloy was composed of 20 atom % Nd, 10 atom % Tb, 24 atom % Fe, 6 atom % B, 1 atom % Al, 2 atom % Cu, and the balance of Co and is designated Alloy B. Using a Brown mill in a nitrogen atmosphere, Alloy B was coarsely pulverized to a size of up to 30 mesh.

Subsequently, Alloy A powder and Alloy B powder were weighed in amounts of 90% and 10% by weight, respectively, and mixed together on a V blender which had been purged with nitrogen. On a jet mill using high-pressure nitrogen gas, the mixed powder was finely pulverized to an average particle size of 4 μm. The resulting fine powder was compacted in a nitrogen atmosphere under a pressure of about 1 ton/cm$^2$ while being oriented in a magnetic field of 15 kOe. The green compact was then placed in a sintering furnace in an argon atmosphere where it was sintered at 1,060° C. for 2 hours, obtaining a permanent magnet block. Using a diamond grinding wheel, the permanent magnet block was machined on all the surfaces into parallelepiped magnet pieces as shown in FIG. 3. These magnet pieces were dimensioned to L=18 mm, W=70 mm and T=20 mm (T in magnetic anisotropy direction). C-shaped magnet pieces as shown in FIG. 10 were also manufactured by all surface machining. These magnet pieces were dimensioned to L=22.5 mm, W=100 mm and T=11 mm. The machined magnet pieces were cleaned with an alkaline solution, pickled and dried. Steps of rinsing with deionized water were included before and after each cleaning step.

Next, dysprosium fluoride having an average particle size of 5 μm was mixed with ethanol at a weight fraction of 50%, in which the parallelepiped and C-shaped magnet pieces were immersed for one minute with ultrasonic waves being applied. The magnet pieces were pulled up and immediately dried with hot air. At this point, the filling factor of dysprosium fluoride in the magnet surface-surrounding space was 45%. The magnet pieces were subjected to absorption treatment in an argon atmosphere at 900° C. for one hour, then to aging treatment at 500° C. for one hour, and quenched, obtaining parallelepiped magnet pieces M1 and C-shaped magnet pieces M3. For comparison purposes, only heat treatment was carried out to produce parallelepiped magnet pieces P1 and C-shaped magnet pieces P3.

Magnet pieces of the same shapes as M1 and M3 were provided. Terbium fluoride having an average particle size of 5 μm was mixed with ethanol at a weight fraction 50% and applied to four surfaces of each magnet piece which extended parallel to the magnetization direction. The magnet pieces were immediately dried with hot air. At this point, the filling factor of terbium fluoride in the magnet surface-surrounding space was 45%. The magnet pieces were subjected to absorption treatment in an argon atmosphere at 900° C. for one hour, then to aging treatment at 500° C. for one hour, and quenched, obtaining treated magnet pieces. The parallelepiped magnet pieces are designated M2 and the C-shaped magnet pieces designated M4.

The magnetic properties of these magnet pieces (as measured by a vibrating sample magnetometer) are shown in Table 1. For magnetic property measurement, cubic samples of 1 mm one side were cut out so that the magnetic properties of different regions of a magnet piece were evaluated.

Location of Magnetic Property Measuring Samples

Magnetic property measuring samples are 1 mm cubic.
1 mm cubic from surface to 1 mm
M1, M2, P1: center in W direction,
center in T direction,
from surface to 1 mm in L direction
M3, M4, P2: center in W direction,
center in L direction,
from surface to 1 mm in T direction
Center
1 mm cubic exactly at the center
M1, M2, P1: center in W direction,
center in T direction,
center in L direction (9 mm from surface)
M3, M4, P2: center in W direction,
center in L direction,
center in T direction (5.5 mm from surface)

As compared with the coercive force of magnet piece P1 not subjected to dysprosium absorption treatment, the permanent magnet piece M1 within the scope of the invention showed a coercive force increase of 500 kAm$^{-1}$ at the outermost periphery. Since the magnet interior was at a distance of 9 mm from the surface, the interior absorbed no dysprosium, with its coercive force kept unchanged. A distribution of coercive force was determined, finding coercive force increases in a region extending 6 mm from the surface. The magnet piece M2 subjected to terbium absorption treatment also showed coercive force increases in a region extending 6 mm from the surface, marking a coercive force increase of 800 kAm$^{-1}$ as compared with the coercive force of magnet piece P1 not subjected to absorption treatment. The permanent magnet pieces within the scope of the invention had a decline of remanence which was as small as 5 mT. Further, the permanent magnet piece M3 within the scope of the invention showed a coercive force increase of 500 kAm$^{-1}$ at the outermost periphery. Since the magnet interior was at a closer distance of 5.5 mm from the surface than in magnet piece M1, it showed a coercive force increase of 100 kAm$^{-1}$ due to prevailing diffusion and absorption of dysprosium from the surfaces perpendicular to the magnetization direction. The magnet piece M4 subjected to terbium absorption treatment marked a coercive force increase of 800 kAm$^{-1}$ at the surface and 200 kAm$^{-1}$ at the interior, as compared with the coercive force of magnet piece P1 not subjected to absorption treatment. For comparison purposes, a permanent magnet was prepared using an alloy composition having Dy substituted for part of Nd in Alloy A, so as to achieve a coercive force increase of 500 kAm$^{-1}$, but a remanence drop of 50 mT was found.

By backscattered electron image under SEM and electron probe microanalysis (EPMA) of magnet piece M1, Dy and F were observed in the magnet. Since the magnet prior to the treatment does not contain Dy and F, the presence of Dy and F in magnet piece M1 is attributable to the absorption treatment according to the invention. Dy absorbed concentrates near grain boundaries. On the other hand, fluorine (F) is also present in the grain boundary portion and bonds with oxides (contained in the magnet prior to the treatment as incidental impurities) to form oxyfluorides. The distribution of Dy enabled to increase the coercive force while minimizing a decline of remanence.

TABLE 1

| | | | Magnetic properties | | |
|---|---|---|---|---|---|
| | Magnet piece | | Br, T | Hcj, kAm$^{-1}$ | (BH)max, kJm$^{-3}$ |
| Example 1 | M1 | Surface | 1.415 | 1,500 | 390 |
| | | Center | 1.420 | 1,000 | 395 |
| Example 2 | M2 | Surface | 1.415 | 1,800 | 390 |
| | | Center | 1.420 | 1,000 | 395 |
| Example 3 | M3 | Surface | 1.415 | 1,500 | 390 |
| | | Center | 1.418 | 1,100 | 394 |
| Example 4 | M4 | Surface | 1.415 | 1,800 | 390 |
| | | Center | 1.418 | 1,200 | 394 |
| Comparative Example 1 | P1 | Surface | 1.420 | 1,000 | 395 |
| | | Center | 1.420 | 1,000 | 395 |
| Comparative Example 2 | P2 | Surface | 1.420 | 1,000 | 395 |
| | | Center | 1.420 | 1,000 | 395 |

Performance of IPM Motors Using Magnets of Examples 1, 2 & Comparative Example 1

Magnet pieces M1, M2 of the invention and magnet pieces P1 of Comparative Example are incorporated in permanent magnet motors, whose performance is described below.

The permanent magnet motor is an IPM motor as shown in FIG. 1. The rotor includes a rotor yoke of four-pole structure consisting of laminated 0.5 mm magnetic steel sheets having permanent magnet segments embedded therein. The rotor yoke has an outer diameter of 312 mm and a height of 90 mm. The permanent magnet segments embedded each have a width of 70 mm, a dimension of 20 mm in the magnetic anisotropy direction, and an axial dimension of 90 mm. The magnet segment consists of five axially divided magnet pieces. The stator has a six-slot structure of laminated 0.5 mm magnetic steel sheets with a concentrated winding coil of 60 turns on each teeth. The coils are of a three-phase Y-connection of U, V and W phases.

As shown in FIG. 3, five magnet pieces M1 or M2 subjected to the inventive treatment or five untreated magnet pieces P1 were joined with an epoxy adhesive into an assembly, which was magnetized and incorporated in the rotor yoke. The motors having the magnet pieces M1, M2, and P1 incorporated therein are designated MM1, MM2, and MP1, respectively. The motor was continuously operated for one hour at a revolution of 2,400 rpm and a RMS current of 50 A for each phase. From the ratio of the torque immediately after the continuous operation to the torque when operated again from the fully cooled state after the continuous operation, a percentage of demagnetization in the permanent magnet was evaluated. The results are summarized in Table 2. Provided that A is the torque immediately after the continuous operation and B is the torque when operated again from the fully cooled state after the continuous operation, a percentage of demagnetization is given by the following equation.

$$\text{Percent demagnetization} = (A+B)/A \times 100$$

In the states A and B which are immediately after operation, the magnets are at the same temperature. A change corresponds to a reduction of the magnet temperature by an eddy current loss during continuous operation. Under these test conditions, motor MP1 of Comparative Example 1 showed a torque reduction of 11% whereas motors MM1 and MM2 of Examples showed little or no torque reduction. It is demonstrated from these data that the demagnetization by an eddy current loss is minimized by the improved coercive force near the magnet surface.

TABLE 2

Percent demagnetization of IPM motors

| | Motor | Magnet piece | Demagnetization, % |
|---|---|---|---|
| Example 1 | MM1 | M1 | 0 |
| Example 2 | MM2 | M2 | 0 |
| Comparative Example 1 | MP1 | P1 | 11 |

Performance of SPM Motors Using Magnets of Examples 3, 4 & Comparative Example 2

Magnet pieces M3, M4 of the invention and magnet pieces P2 of Comparative Example are incorporated in permanent magnet motors, whose performance is described below.

The permanent magnet motor is an SPM motor as shown in FIG. 8. The rotor includes a rotor yoke of four-pole structure consisting of laminated 0.5 mm magnetic steel sheets having permanent magnet segments adhesively attached to the surface thereof. The rotor has an outer diameter of 312 mm and a height of 90 mm. The permanent magnet segments embedded each have a width of 100 mm, a dimension of 11 mm in the magnetic anisotropy direction, and an axial dimension of 90 mm. The magnet segment consists of four axially divided magnet pieces. The stator is the same as in Examples 1, 2 and Comparative Example 1.

As shown in FIG. 10, four magnet pieces M3 or M4 subjected to the inventive treatment or four untreated magnet pieces P2 were joined with an epoxy adhesive into an assembly, which was magnetized and adhesively attached to the surface of the rotor yoke. The motors having the magnet pieces M3, M4, and P2 incorporated therein are designated MM3, MM4, and MP2, respectively. The motor was continuously operated for one hour at a revolution of 2,400 rpm and a RMS current of 50 A for each phase. From the ratio of the torque immediately after the continuous operation to the torque when operated again from the fully cooled state after the continuous operation, a percentage of demagnetization in the permanent magnet was evaluated. The results are summarized in Table 3. Under these test conditions, motor MP2 of Comparative Example 2 showed a torque reduction of 32% whereas motors MM3 and MM4 of Examples showed little or no torque reduction. For the SPM motors, it is demonstrated that the demagnetization by an eddy current loss is minimized by the improved coercive force near the magnet surface.

TABLE 3

Percent demagnetization of SPM motors

| | Motor | Magnet piece | Demagnetization, % |
|---|---|---|---|
| Example 3 | MM3 | M3 | 0 |
| Example 4 | MM4 | M4 | 0 |
| Comparative Example 2 | MP2 | P2 | 32 |

While Examples refer to permanent magnet motors, permanent magnet power generators have the same advantages because they are of the same structure.

The invention claimed is:

1. In connection with a permanent magnet rotary machine comprising a rotor comprising a rotor core and a plurality of permanent magnet segments embedded in the rotor core and a stator comprising a stator core having a plurality of slots and windings therein, the rotor and the stator being disposed to define a gap therebetween, or a permanent magnet rotary machine comprising a rotor comprising a rotor core and a plurality of permanent magnet segments mounted on the surface of the rotor core and a stator comprising a stator core having a plurality of slots and windings therein, the rotor and the stator being disposed to define a gap therebetween,
the rotor wherein each of said permanent magnet segments is an assembly of further divided permanent magnet pieces, each of the divided permanent magnet pieces has a coercive force at a surface and an interior, and the coercive force near the surface of the magnet piece is higher than that in the interior of the magnet piece,
wherein each of the divided permanent magnet pieces has a coercive force near the entire surface of all surfaces of the magnet piece that are parallel to a magnetization direction of the magnet piece that is higher than in the interior of the magnet piece.

2. The rotor for a permanent magnet rotary machine of claim 1 wherein the magnet pieces are of a sintered Nd base rare earth magnet.

3. The rotor for a permanent magnet rotary machine of claim 2 wherein each piece of sintered Nd base rare earth magnet has a coercive force profile from the surface toward the interior, which is created by letting Dy or Tb diffuse from the surface toward the interior of the magnet piece.

4. The rotor for a permanent magnet rotary machine of claim 2 wherein each piece of sintered Nd base rare earth magnet has a coercive force profile from the surface toward the interior, which is created by letting Dy or Tb diffuse from the surface toward the interior of the magnet piece mainly via grain boundaries.

5. The rotor for a permanent magnet rotary machine of claim 3 wherein the step of letting Dy or Tb diffuse from the surface toward the interior of the sintered Nd base rare earth magnet piece includes applying a Dy or Tb oxide powder, a Dy or Tb fluoride powder or a Dy or Tb-containing alloy powder to surfaces of the magnet piece, then holding the magnet piece at a high temperature sufficient to diffuse Dy or Tb.

6. The rotor for a permanent magnet rotary machine of claim 1, wherein each of the divided permanent magnet pieces has a coercive force near the entire surface of all surfaces of the magnet piece around the entire periphery of the magnet piece that is higher than in the interior of the magnet piece.

7. The rotor for a permanent magnet rotary machine of claim 1, wherein each of the divided permanent magnet pieces has a coercive force near the entire surface of all surfaces of the magnet piece that is altered by a surface treatment of at least an entire surface of the magnet piece that is parallel to a magnetization direction of the magnet piece.

8. The rotor for a permanent magnet rotary machine of claim 1, wherein each of the divided permanent magnet pieces has a coercive force near the entire surface of all surfaces of the magnet piece that is altered by a surface treatment of the entire surface of all surfaces of the magnet piece.

9. The rotor for a permanent magnet rotary machine of claim 7, wherein said surface treatment is a material applied by sputtering and heat treatment.

10. The rotor for a permanent magnet rotary machine of claim 8, wherein said surface treatment is a material applied by sputtering and heat treatment.

11. The rotor for a permanent magnet rotary machine of claim 7, wherein said surface treatment is around the entire periphery of each magnet piece within a depth near the surface around the entire periphery of each magnet piece.

12. The rotor for a permanent magnet rotary machine of claim 7, wherein said surface treatment is within about 6 mm from the surface of each of the magnet pieces.

13. The rotor for a permanent magnet rotary machine of claim 7, wherein said surface treatment involves a material diffused from the surface inward around a plurality of sides of each of said magnet pieces.

14. The rotor for a permanent magnet rotary machine of claim 7, wherein for each magnet segment there are between 2 to 50 divisions of magnet pieces.

15. The rotor for a permanent magnet rotary machine of claim 7, wherein for each magnet segment there are between 4 to 25 divisions of magnet pieces.

16. The rotor for a permanent magnet rotary machine of claim 1 wherein the magnet segment consists of axially divided magnet pieces.

17. In connection with a permanent magnet rotary machine comprising a rotor comprising a rotor core and a plurality of permanent magnet segments embedded in the rotor core and a stator comprising a stator core having a plurality of slots and windings therein, the rotor and the stator being disposed to define a gap therebetween, or a permanent magnet rotary machine comprising a rotor comprising a rotor core and a plurality of permanent magnet segments mounted on the surface of the rotor core and a stator comprising a stator core having a plurality of slots and windings therein, the rotor and the stator being disposed to define a gap therebetween, the rotor wherein each of said permanent magnet segments is an assembly of further divided permanent magnet pieces, each of the divided permanent magnet pieces has a coercive force at a surface and an interior, and the coercive force near the surface of the magnet piece is higher than that in the interior of the magnet piece, wherein each of the divided permanent magnet pieces has a coercive force near the entire surface of all surfaces of the magnet piece that are parallel to a magnetization direction of the magnet piece that is higher than in the interior of the magnet piece, and wherein each of the divided permanent magnet pieces has heat resistance at a surface and an interior, and the heat resistance near the surface of the magnet piece is higher than that in the interior of the magnet piece.

\* \* \* \* \*